(12) United States Patent
Ching et al.

(10) Patent No.: US 7,222,354 B1
(45) Date of Patent: May 22, 2007

(54) DYNAMIC COMPOSITION AT THE SET-TOP BOX

(75) Inventors: Jennie Ching, Northridge, CA (US); Eric Hsiao, San Marino, CA (US); Peter S. Lee, Calabasas Park, CA (US); Edith H. Stern, Boca Raton, FL (US); Barry E. Willner, Briarcliff Manor, NY (US)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/412,969

(22) Filed: Oct. 5, 1999

(51) Int. Cl.
*H04N 7/10* (2006.01)

(52) U.S. Cl. .................. 725/35; 725/46; 725/47; 725/59

(58) Field of Classification Search ............. 725/109, 725/32, 36, 33, 138, 152, 140, 34–35, 46–47, 725/59, 132; 709/201, 203, 217–219; 707/102, 707/104.1, 205
See application file for complete search history.

(56) References Cited

U.S. PATENT DOCUMENTS

| | | | | |
|---|---|---|---|---|
| 5,029,014 | A | * | 7/1991 | Lindstrom ................. 386/106 |
| 5,038,403 | A | * | 8/1991 | Leitch ...................... 455/503 |
| 5,099,319 | A | * | 3/1992 | Esch et al. ................. 348/722 |
| 5,594,490 | A | * | 1/1997 | Dawson et al. .............. 725/67 |
| 5,600,573 | A | * | 2/1997 | Hendricks et al. .......... 725/109 |
| 5,664,046 | A | * | 9/1997 | Abecassis .................. 386/125 |
| 5,720,037 | A | * | 2/1998 | Biliris et al. ............... 709/219 |
| 5,732,216 | A | * | 3/1998 | Logan et al. ............... 709/203 |
| 5,892,915 | A | * | 4/1999 | Duso et al. ................ 709/219 |
| 5,899,582 | A | * | 5/1999 | DuLac ...................... 386/125 |
| 5,913,039 | A | * | 6/1999 | Nakamura et al. .......... 709/231 |
| 5,936,659 | A | * | 8/1999 | Viswanathan et al. ....... 725/103 |
| 6,026,368 | A | * | 2/2000 | Brown et al. ................. 705/14 |
| 6,029,045 | A | * | 2/2000 | Picco et al. ................. 725/34 |
| 6,248,946 | B1 | * | 6/2001 | Dwek .................... 434/307 A |
| 6,298,482 | B1 | * | 10/2001 | Seidman et al. ............ 725/100 |

(Continued)

FOREIGN PATENT DOCUMENTS

EP 08/30019 3/1998

(Continued)

OTHER PUBLICATIONS

U.S. Appl. No. 09/350,826, filed Jul. 9, 1999, Stern et al.

*Primary Examiner*—Ngoc Vu
(74) *Attorney, Agent, or Firm*—James D. Palmer; Jeffrey N. Giunta; Fleit, Kain, Gibbons, Gutman, Bongini & Bianco P.L.

(57) ABSTRACT

A method for displaying on a viewer information processing system with an interface to a display (a device for rendering audio and video), a set of multimedia segments to form a multimedia presentation. The method comprising the steps of receiving the play-list, wherein the play-list is a list of instructions for rendering each of the multimedia segments, and the sequence of the multimedia segments in the play-list is directed by the provider of the presentation; receiving multimedia segments and rendering the multimedia segments received based on the play-list.

In accordance with another embodiment of the present invention, an information processing system and computer readable storage medium is disclosed for carrying out the above method.

33 Claims, 9 Drawing Sheets

| SEGMENT POINTER | DATE | TIME | DURATION | RENDERING INSTRUCTION | SEGMENT AVAILABILITY |
|---|---|---|---|---|---|
| 1ST SEGMENT | 123 | 11:00:00:00 | 00:00:30:00 | VIDEO POINTER | SCHEDULED |
| 2ND SEGMENT | 123 | 11:00:30:00 | 00:15:20:10 | VIDEO POINTER, W/ AUDIO OVERLAY | SCHEDULED |
| 3RD SEGMENT | 123 | 11:12:40:20 | 00:00:10:20 | AUDIO OVERLAY | 1 HOUR PRIOR |
| • | • | • | • | • | • |
| • | • | • | • | • | • |
| NTH SEGMENT | 124 | 00:00:15:00 | 00:00:15:00 | VIDEO POINTER | SCHEDULED |

U.S. PATENT DOCUMENTS

| | | | |
|---|---|---|---|
| 6,441,832 B1 * | 8/2002 | Tao et al. | 345/723 |
| 6,452,609 B1 * | 9/2002 | Katinsky et al. | 345/716 |
| 6,473,903 B2 * | 10/2002 | Balakrishnan et al. | 725/135 |
| 6,571,392 B1 * | 5/2003 | Zigmond et al. | 725/110 |
| 6,718,551 B1 * | 4/2004 | Swix et al. | 725/32 |

FOREIGN PATENT DOCUMENTS

| | | |
|---|---|---|
| EP | 08/75846 | 11/1998 |
| EP | 0875846 | 11/1998 |
| WO | 95/15657 | 6/1995 |

* cited by examiner

| SEGMENT POINTER | DATE | TIME | DURATION | RENDERING INSTRUCTION | SEGMENT AVAILABILITY |
|---|---|---|---|---|---|
| 1ST SEGMENT | 123 | 11:00:00:00 | 00:00:30:00 | VIDEO POINTER | SCHEDULED |
| 2ND SEGMENT | 123 | 11:00:30:00 | 00:15:20:10 | VIDEO POINTER, W/ AUDIO OVERLAY | SCHEDULED |
| 3RD SEGMENT | 123 | 11:12:40:20 | 00:00:10:20 | AUDIO OVERLAY | 1 HOUR PRIOR |
| • | • | • | • | • | • |
| • | • | • | • | • | • |
| NTH SEGMENT | 124 | 00:00:15:00 | 00:00:15:00 | VIDEO POINTER | SCHEDULED |

DYNAMIC COMPOSITION AT THE SET-TOP BOX

CROSS-REFERENCE TO RELATED APPLICATIONS

Not Applicable.

BACKGROUND OF THE INVENTION

1. Field of the Invention

The invention relates to the field of transmission of video programs and more specifically to a system for presenting multimedia programs that is customized to a specific audience, which may be as granular as an audience of one.

2. Description of the Related Art

Providers of broadcast, satellite and cable television offer a variety of programming channels. In fact, it is common for many viewers to be able to choose from over one hundred channels, which are a combination of channels provided by national networks, by local cable providers and a variety of cable programmers. Many of the new television sets come with the capacity to receive more than a hundred channels. Local providers of cable television are usually granted exclusive rights to provide cable programming to a specific community, town, or defined locale. These providers are able to customize channel offerings based on the geographic location of the subscribers. For example, a program offering advice on "ice fishing" would most likely enjoy a higher viewer audience in northern Minnesota rather than Southern Florida. And while providers of television programs continue to offer more content, this increase in content is not without its shortcomings.

One shortcoming is that the television programs are not customized to individual viewer's demographics and taste. Stated differently, the program content is not as focused as the providers of these programs desire. The amount of selection a provider of a program can control is usually based on geography alone. Accordingly, a need exists for a method and apparatus to enable the providers of television programming content to customize their offering based on criteria other than geography.

Another shortcoming with current television programs is that the program content and advertisement content cannot each be separately customized. All viewers within the same geography receive the same advertising and programming content. Accordingly, a need exists for a method and apparatus to enable the providers of television programming the ability to customize both their program content and their advertisement content separately based on criteria other than geography.

Another shortcoming of conventional television is the inability of the providers of television programming to combine multiple sources of program and advertisement distribution in a customized fashion. One solution known allows user driven interaction with the Internet and the television to combine multiple sources. One solution such as Microsoft's WebTV or Intel's Intercast allows a user to view both television broadcast programs and surf the Internet on a television. This solution allows the viewing of several sources of information, but does not combine the sources of information. In fact if the user desires to combine multiple sources of information, the user must program a VCR or other device to record information from a variety of sources such as broadcast and the Internet. For many people the experience of having the program information delivered passively rather than programming devices to receive and combine information from a variety of sources is important. There is a need to retain the passive viewing experience for a user, while allowing the providers of television programming to combine multiple sources of program and advertisement distribution (for example, broadcast, Internet, CDS, DVDs and other computer readable material) in a customized fashion.

Moreover, all forms of broadcast and cable television program distribution are limited by available bandwidth. There is currently no mechanism to combine program material and advertisement from several different sources, or to store information as directed by the program provider on a viewer system prior to being displayed. Accordingly, a need exists for a method and apparatus to overcome this problem.

Still, another shortcoming with current cable distribution system is the inability to tailor program content based on the viewer. For example, a program involving scenes for mature audiences, such as the known movie ratings of R or NC-17 is not appropriate for small children, although the story line may be appropriate. One example is the popular movie entitled "Titanic." The violence, mature subject matter and adult scenes are not appropriate for children. Providers of programming materials have no mechanism by which to tailor their information to specific viewers such as children, adults or other criterion. Accordingly, a need exists for a method and apparatus to provide customized programming to viewers.

SUMMARY OF THE INVENTION

Briefly, in accordance with the present invention, a method for displaying on a viewer information processing system with an interface to a device for rendering audio video display, a set of multimedia segments to form a multimedia presentation. The method comprising the steps of: receiving a play-list, wherein the play-list is a list of instructions for rendering each of the multimedia segments, and the sequence of the multimedia segments in the play-list is directed by the provider of the presentation; receiving multimedia segments; and rendering the multimedia segments received based on the play-list.

In accordance with another embodiment of the present invention, an information processing system and computer readable storage medium is disclosed for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions:

The following definitions are utilized in this document:

group addressing—the process of sending out an identical play-list to one or more clients based on the demographics of the members of the group, such as age, gender, income, zip code, weather, or other factors an advertiser or program provider would use to group audiences.

provider—one or more entities or companies that provide the play-list, the multimedia segments for a presentation and the group addressing.

viewer information processing system—any thing that can process data or information including microprocessor machines such as PCS and set-top boxes. The viewer information processing system can be logically and physically distinct from a cable set-top box, TV or integrated into one unit.

multimedia segment(s)—a multimedia segment is a portion of a multimedia presentation. Multiple segments are rendered to form the complete program. Examples of segments include the following: 1) long video track; 2) audio track; 3) an audio/video track; 4) an audio special effects track; 5) a short video scene, or still images; and. 6) video special effect track, such as post-production product placement. These segments are combined to form the multimedia presentation. Segmenting the multimedia program in this manner allows the delivery of voice tracks in different languages, as well as different video segments that are age or culturally appropriate.

play-list(s)—a list of instructions for rendering each of the multimedia segments. The play list is typically managed and changed by the provider of the presentation. A play-list can be thought of as a "bill of materials" complete with the order for assembling the multimedia segments for a presentation.

Overview of Cable Head-End

Figure 1:
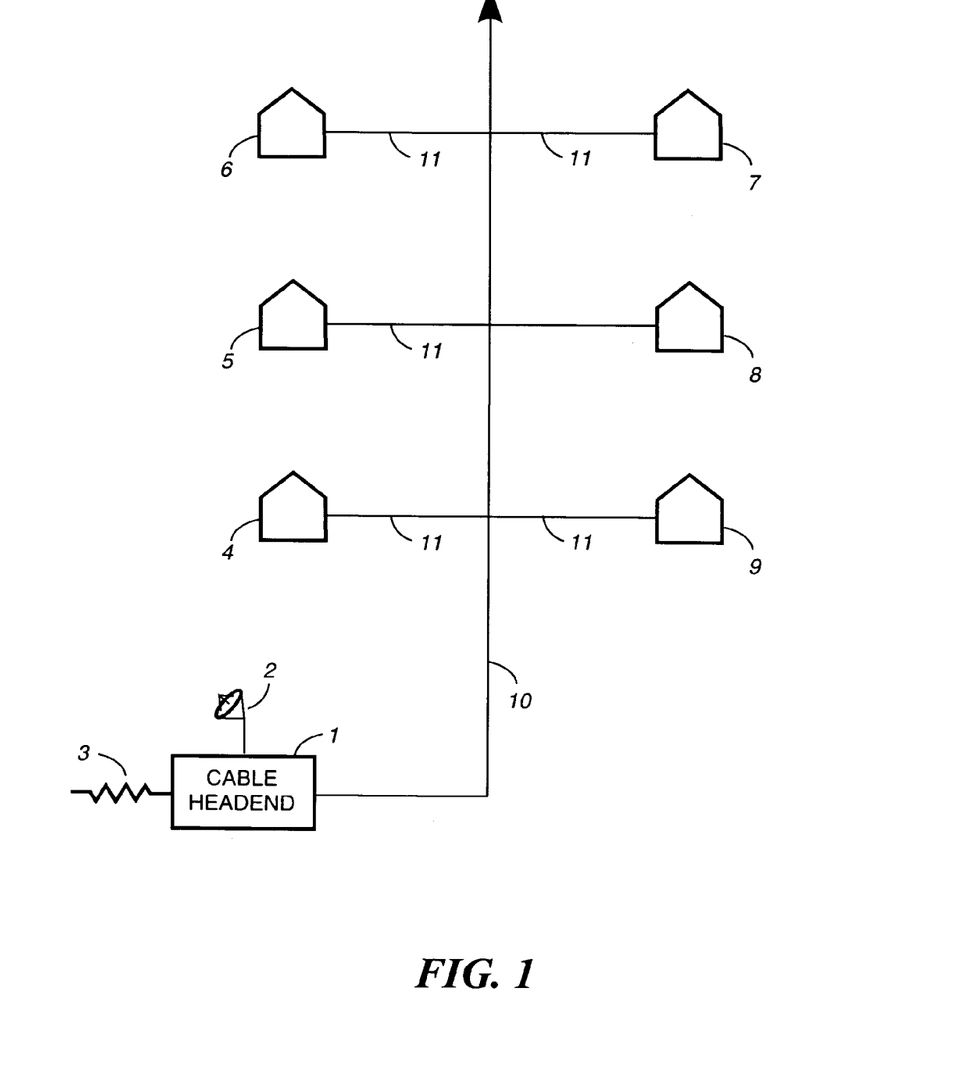
FIG. 1 is a block diagram of a cable head-end and its customers.

Referring now in more detail to the drawings in which like numerals refer to like parts throughout several views, as described in FIG. 1, there is shown a cable head-end 1 coupled to a plurality of customers (or viewers) 4-7 and 9, each represented by a house icon. Note, the use of a house icon here is not meant to limit this embodiment to households only. It will be understood to those skilled in the art the household can also be an entity such as a company. A cable head-end 1, which is connected via a satellite dish 2 and a landline 3 to receive television program materials and digital services, command and control information, and attachment to networks and services such as the Internet.

The output from the cable plant 1 is typically transmitted through a hybrid fiber coaxial network 10 which is organized in a tree and branch structure, passing homes in the community. The icons representing homes 4, 5, 6, 7, and 9 represent cable customers, shown by connection to the cable plant 11. The home 8 is not a cable subscriber and hence is not connected to the network 10. According to one aspect of the invention, the cable company at the head-end 1 can transmit program content (e.g., television programs) and play-lists to coordinate the display of the multimedia segments received at viewers' units (e.g., a set-top box coupled to a television receiver or an information processing apparatus with a display). A programming distributor will generally obtain information from, or about, its customers that is of great use to program providers and advertisers. In today's broadcast television environment there is no possibility for directing signals at an individual viewer's unit. In the system of FIG. 1 the cable head-end 1 can transmit play-lists that are recognized at the viewer's unit and used to select multimedia segments for display to the viewer. Thus, the system topology shown in FIG. 1 also represents a new business model for tailoring and delivering multimedia segments in a network such as a cable network or a public data network such as the Internet. This business model enables the following offering. It enables the cable head-end 1 to now tailor and charge for multimedia segments tailored to a viewer. For example, an advertiser may buy "1234 Any street" between 6 AM and 5 PM to show commercials for toys.

The cable head-end 1, a provider, can now be a provider of the "doctor show channel", created for medical enthusiasts. The cable head-end 1 would create a play-list that stitched together any broadcast shows with medical content, potentially select a choice based on user demographics or preference if two shows are available at the same time, and transmit content owned by the cable head-end 1 to the set-top over the internet for play when no broadcast satisfies the conditions.

In another example, the provider can provide programs customized for many different audiences with only an incremental use of bandwidths (e.g. frequency spectrum, or megabits per second) over broadcasting a single program in common for everyone. Consider the case where the program material is customized for the following audiences—young women, middle aged women, and older women. Ninety five percent of the program content (multimedia segments) is common for these three audiences, representing material of general interest to women, and women's issues. Program material (multimedia segments) that is specific to the different groups, for example, information on cosmetics for teenagers, child-rearing, or retirement planning, composes the other 5% of the content, and represents the customization geared to these audiences. The provider, by sending the appropriate play-lists (and potentially multimedia segments) to members of these groups, can effectively provide three different channels using only 10% more bandwidth than a single channel.

In another example, a play-list may cause a tailored message to a specific viewer. A child may be watching an episode of a children's program, such as Barney or Sesame Street and the play-list indicate a multimedia segment containing audio of the child's name to be rendered along with the multimedia segment containing the audio track.

Delivering the Multimedia Segments and Play-Lists

There are several ways in which the cable head-end 1 can ensure the multimedia segments are available at the homes. The multimedia segments and play-lists can be downloaded to a set-top box with storage capabilities through the cable; they can be distributed via a form of removable media, such as CDS, DVDs, or tape; they can be broadcast over the air to an apparatus with storage capabilities and they can be sent over the Internet, or over another telecommunication means, wired or wireless.

The providers of content can sell content based on any useful marketing criteria such as geography, gender, age, zip code, political affiliations, number of children, marital status and other demographic information including interests.

Embodiment of Providing Customized Advertisement

Figure 2:
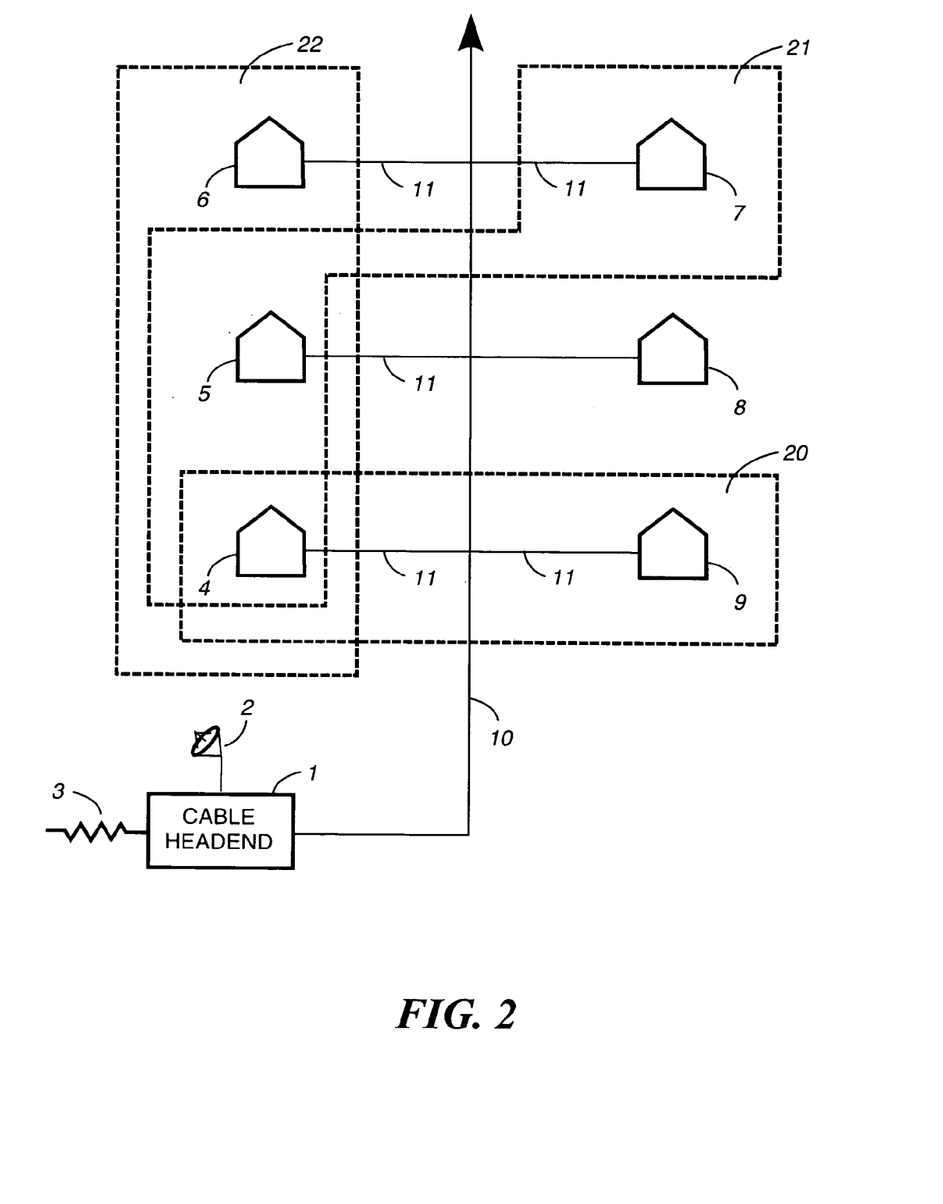
FIG. 2 is a block diagram of a cable company and its customers of FIG. 1 with receiving groups identified, according to the present invention.

FIG. 2 shows receiving groups in the neighborhood comprising homes 4-9. Group 20 is composed of houses 4 and 9; group 21 is composed of houses 7, 5, and 4; and group 22 is composed of houses 6 and 4. Group advertising is the delivery of multimedia segments and play-lists to members of a group. By way of example, group 20 is "addressed" by a beer company to advertise its major brand. The advertising agency of the beer company contracts with the cable company to show 100 impressions of a beer ad to houses 4 and 9. The advertising agency has already determined a high likelihood of beer consumers in households 4 and 9, and therefore contracts with the cable company to deliver their beer commercial to optimize for maximum effectiveness in encouraging beer purchase in those households. Similarly group 22 has been "addressed" by a diaper company to advertise its major brand. The advertising agency of the diaper company contracts with the cable company to show 30 impressions of a diaper ad to houses in group 22, having determined that 30 is the optimum number of repetitions to encourage diaper purchase in homes with infants.

Embodiment of a Playlist

Figure 3:
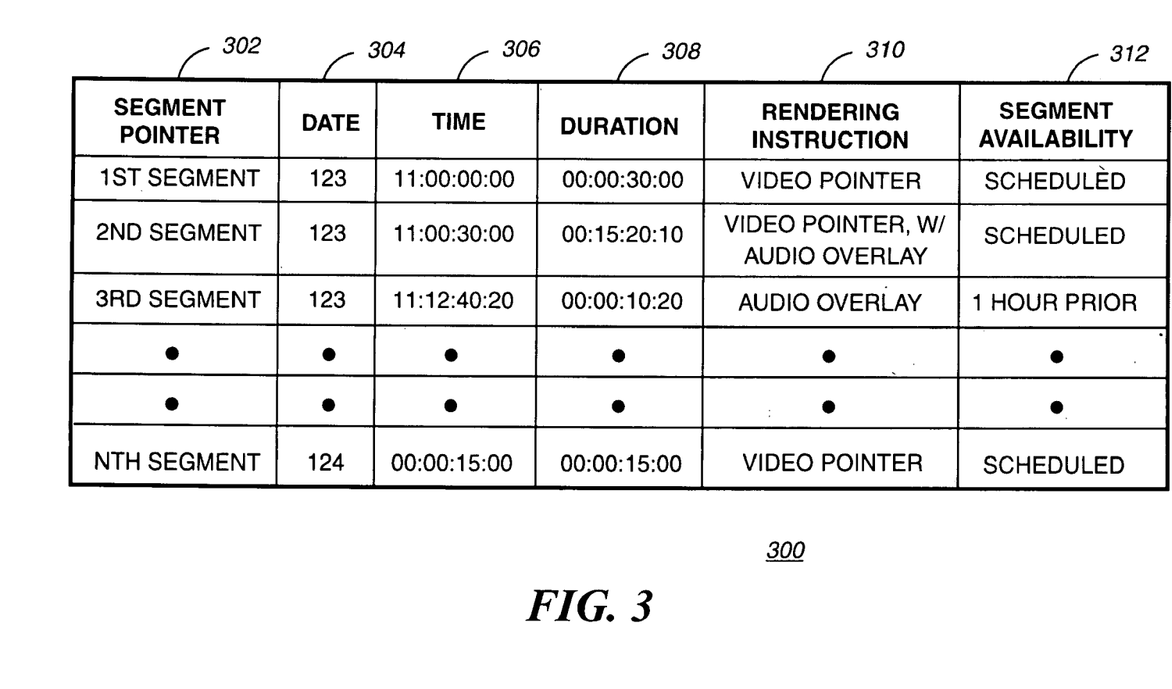
FIG. 3 is a block diagram of a play-list according to the present invention.

Turning now to FIG. 3, shown is a block diagram of a simple play-list 300, which describes a user selectable channel according to the present invention. As stated above, the play-list 300 is a series of pointers to multimedia segments that are combined by the customization device to form the presentation. A pointer 302 to a segment is the first entry in the play-list 300. The pointer indicates where the segment is stored, or from where the segment is available (e.g. broadcast stream channel/time, computer readable medium, internet address). The date of the presentation is shown in column 304 in day-of-year. In column 306, the time the segment is to be rendered is shown in hours, minutes, seconds and frames. Column 310 indicates the rendering instructions, that is, a pointer to a device or software that will appropriately render the multimedia segment. For the first segment, the rendering is to be standard video. For the second segment, the rendering is to be video, with an additional audio overlay track expected. Segment three is an audio segment to be overlaid over the second segment, as indicated by the time and duration fields. In column 312, is required segment availability. That is, this column indicates whether the segment is expected to be first available at the time it is scheduled for rendering, or whether it should be resident locally and at what time prior to play. This is an exemplary play-list only. To those skilled in the art, several other forms of play-list are possible including the elimination of entries 310 and 312.

In order to synchronize the rendering of the multimedia segments specified by play-list 300, and the actual delivery of multimedia segments to a household, time must be synchronized between the user Devices and the provider. This may be done by time synchronization codes (not shown) or by other means such as household access to a GPS clock. Synchronization codes can be sent to the household by satellite, broadcast or the Cable TB infrastructure.

Embodiment of Selling Advertisement

Figure 4:
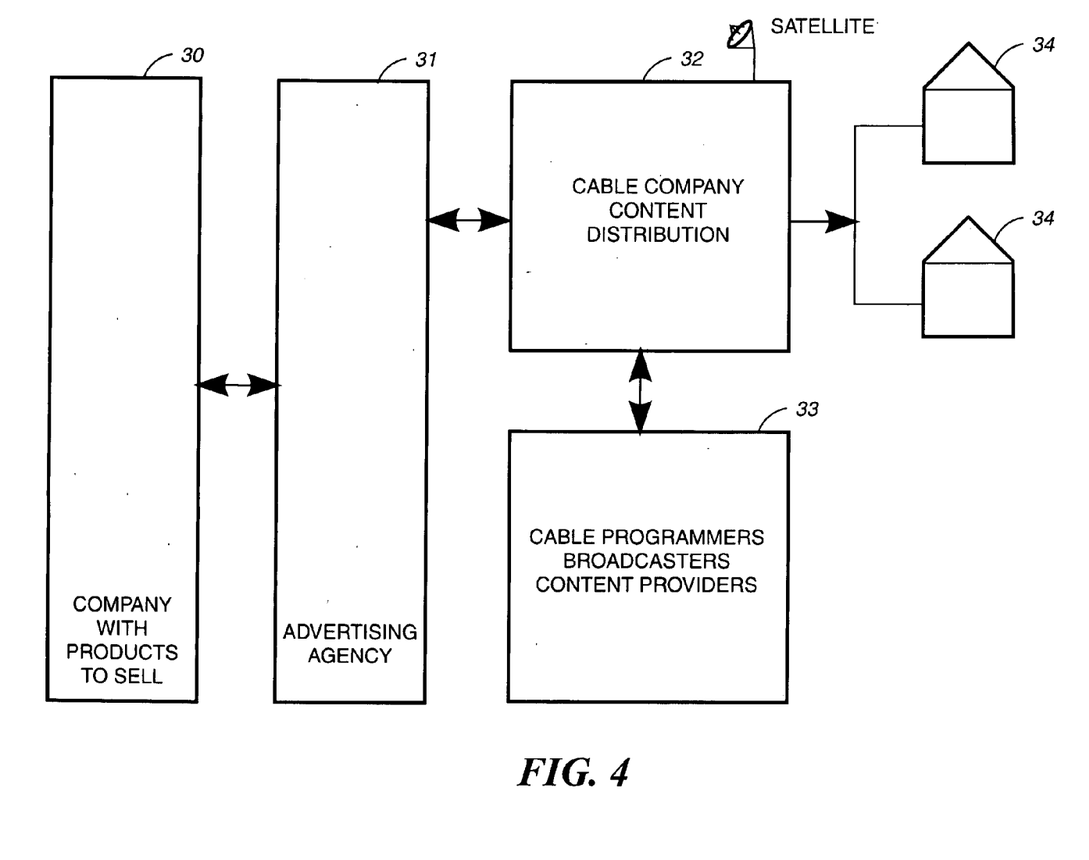
FIG. 4 is a block diagram of the business relationships of the cable company of FIG. 1 according to an aspect of the invention.

FIG. 4 shows the business relationships involved in a business model in accordance with the invention. Companies 30 with products to sell have a relationship with advertising agencies 31. The advertising agencies and the companies 30 select the best "advertising venues," in this model, the best demographics, neighborhoods, and individual households to which the advertising should be targeted. The agencies 31 have a business arrangement with cable companies 32 which have as subscribers those households selected. The cable company has a relationship with cable programmers and other content provider's (33). The cable company 32 agreements specify which commercials may be provided at the households, and which should remain untouched as provided with the channel or programming. For example, it may be that channels 50-80 are candidates for personalized household commercial playback, but no other channels are. It may be that only selected time slots on various channels are permissible to use for personalized household commercial playback. The cable company 32 also has a relationship with its subscribers, in households 34.

An Embodiment for Customized Programs

Figure 5A:
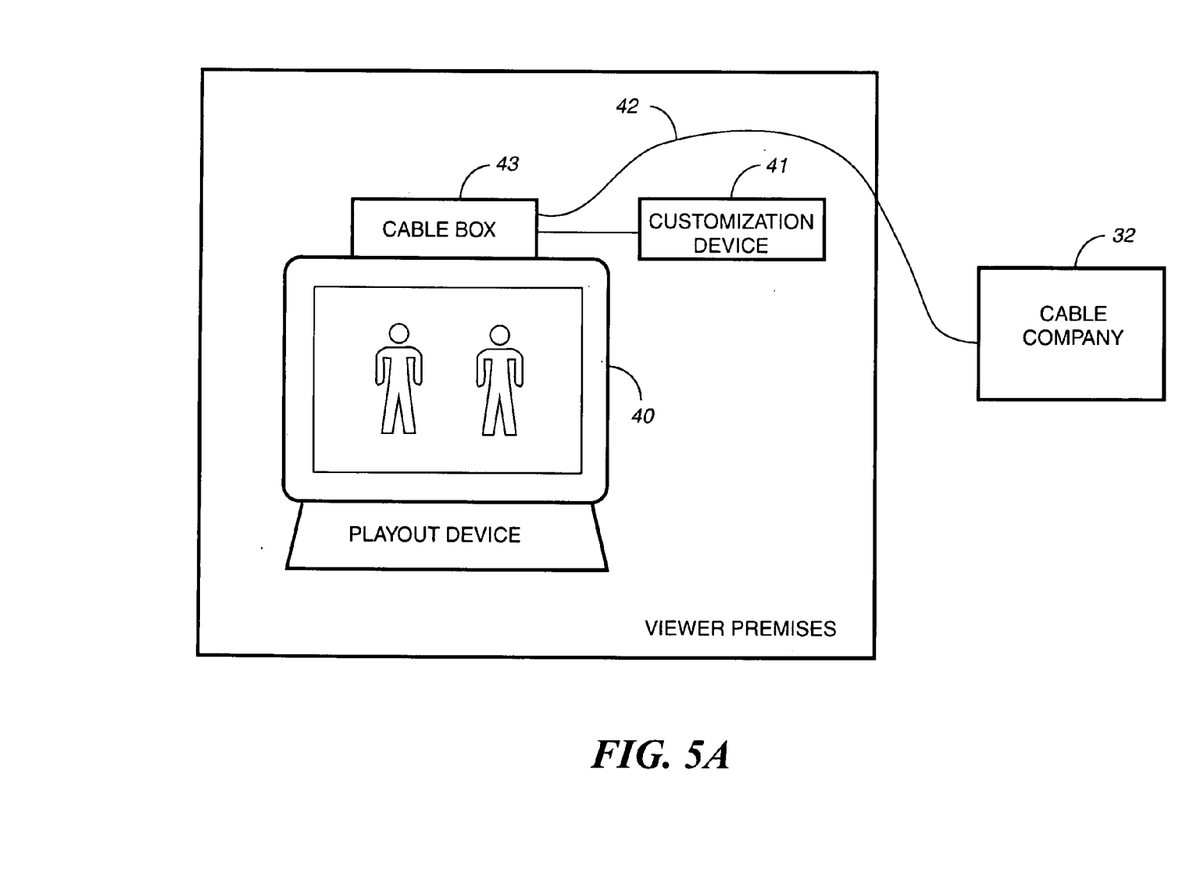
FIG. 5A is a block diagram of a viewer unit, according to the invention.

FIG. 5A shows an customization device 41, for program customization based on a play-list. In the household, it is a playout device 40, such as a television receiver, a set-top box 43, and an customization device 41, for storing the play-list, performing multimedia rendering as directed, and storing program materials as appropriate. The device 41, for program customization may be implemented as a part of the set-top box 43, or as a standalone unit coupled thereto. The set-top 43 is connected via coax 42 to the cable company 32. The device for program customization 41 is connected either directly to the coax and thereby to the cable company, or indirectly through the set-top box 43, or other suitable connection means.

Figure 5B:
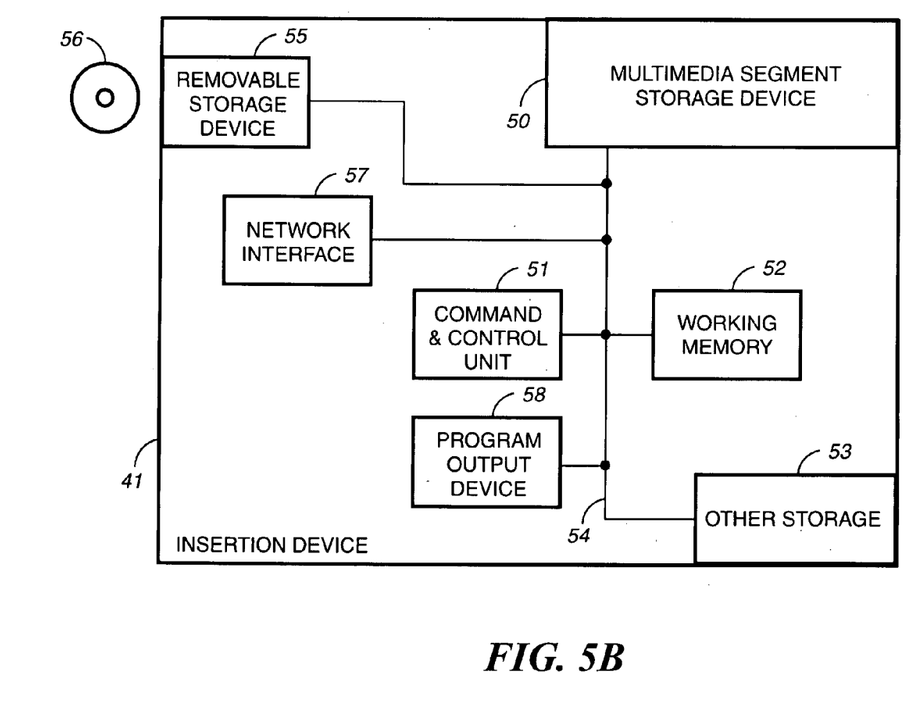
FIG. 5B is a block diagram of a multimedia insertion into received program content.

FIG. 5B shows more detail on the customization device 41. The device 41 contains a means for command and control 51 (e.g., a microprocessor), a working memory (e.g., RAM) 52, and storage for multimedia segments (e.g., a hard disk drive) 50. It also contains other storage 53 for other information such as play-lists 300, algorithms and logs, and a connecting bus 54. The storage 53 can also be used to store computer-readable instructions for adapting the device 41 to operate according to the invention. The device 41 can be implemented as a specialized device or a programmable information handling system such as a personal computer. The customization device 41 can include a removable storage device such as a CD ROM drive 55 for receiving CD ROMs 56 or other machine readable media containing the multimedia segments (the machine readable media can take the form of tangible media or an information signal received over a network). The customization device 41 can optionally include a network interface 57 enabling it to receive data and instructions over the network. The device also includes an output unit 58 for outputting the provided program in a proper format (e.g., NTSC, PAL, MPEG2) and appropriate modulation and control information. In the case of digital transmissions, using multiplexed digital streams, the device 41 will perform de-multiplexing, splicing, insertion and re-multiplexing as necessary. All of the components included in the customization device 41 can also be implemented in a set-top box 43 or a suitable television receiver. The various devices shown in FIG. 5B are all shown coupled to a bus 54 but other connections and well known devices may also be included and have been omitted for purposes of simplicity.

Insertion of Multimedia Segments from Playlist on Viewer Unit

Figure 6A:
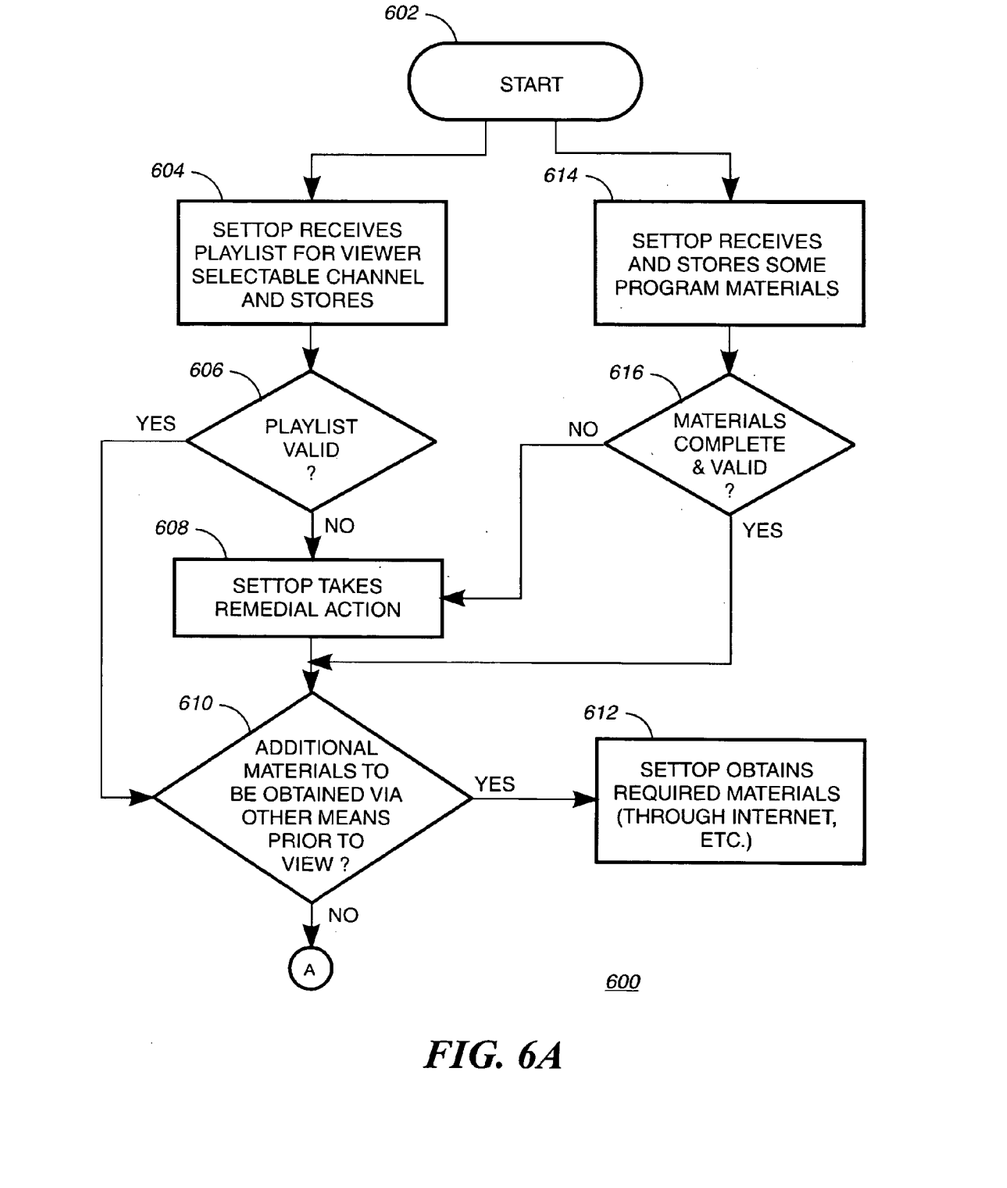
FIGS. 6A and 6B are a flow diagram of the viewer unit of FIG. 5 inserting multimedia segments, according to the present invention.
Figure 6B:
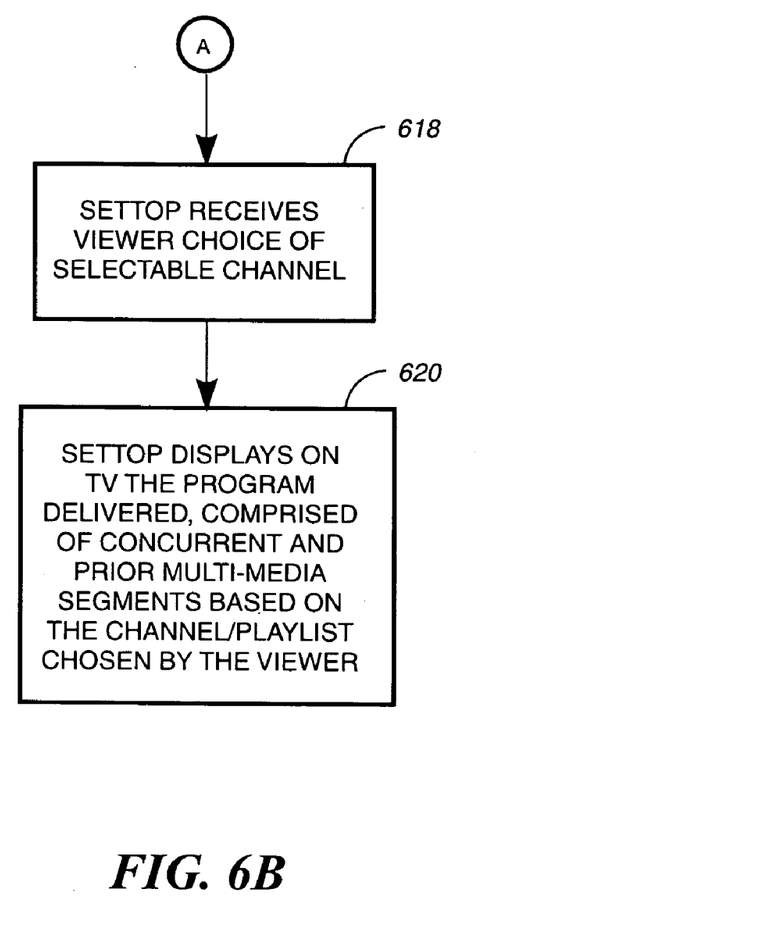

FIGS. 6A and 6B are a flow diagram 600 of the customization device in FIG. 5. For purposes of simplicity, the flow diagram describes the configuration where the customization device 41 and the set-top box 43 are packaged together. In the flow diagram 600, we refer to this combined device, 41 and 43 as the set-top box 43. The process begins with steps 602 and 604, where the set-top box 43, receives a play-list 300 from a head-end 1. In step 606, a check is made to determine if the play-list 300 is valid. The check is a checksum check, parity check or other error detection and error correction algorithms. If the play-list 300 is not valid, in step 608, the unit can wait for a rebroadcast of the play-list 300 or notify the head-end office through a back-end link, such as the Internet that the play-list 300 is invalid (not shown). Once a valid play-list is received, Step 610 determines if additional materials are needed to render the multimedia segments listed on the play-list 300. If additional material is needed to complete the play-list 300, the set-top box 43, requests information from other sources including, computer readable mediums such as CDS, DVDs, the Internet or through other telecommunication and cable channels. Potentially in parallel with these steps, in step 614, the set-top box 43 receives and locally store program materials. In step 616, the process checks if the materials are complete and valid. If the materials are not valid, step 608, the set-top box 43 waits for a rebroadcast of the materials until valid (not shown). Once the combined set-top box 43, receives the viewer's choice of channel, step 618, the play-list 300 for that channel is invoked in step 620, and the program delivered.

In another embodiment, the steps 614 and 616 of storing the information are eliminated, and all of the information is available in realtime through a computer readable medium or through broadcast or other telecommunication. It is important to note that the play-list 300 can combine multimedia segments from a variety of sources.

The combined set-top box 43, may also be optionally required to check that materials represented on the play-list 300 are available at some customizable point before the time required by the play-list 300. That is, if material M, to be available locally from the combined set-top box 43, is scheduled on the play-list 300 for 2 PM, the set-top box 43 may be required to verify at 1 PM that the Material M has been received and is available. Failing such a check may require the set-top box 43 to alert another device or entity, or to take remedial action. These sources include broadcast television, the Internet, CDS, DVDs and any other telecommunications and cable distribution and computer readable mediums.

Play-lists 300 may be supplied for each viewer selectable channel on the viewing device. For example, given a television with a 100 viewer selectable channels, the associated customization device can have a separate play-list 300 for each of the 100 channels. When a viewer turns on the television, and selects a channel, the associated play-list 300 will become active. Thus, the play-list 300, unlike a traditional television channel, is not bound to a singular broadcast stream at a fixed frequency in the broadcast spectrum such as channel 2. The play-list 300 can automatically surf many channels for the viewer to create customized programming. For example, a user wanting to watch news may select a customized channel which shows at 6 p.m.; the news broadcast on channel 2, at 7 p.m.; the news broadcast on channel 5 at 8 p.m.; and the newsfeed at online URL www.cnnfn.com at 10 p.m. The user does not control this assembly—rather, it is a "news channel" he or she has selected. Stated differently, the programming material is compiled from different sources at the user's location in time for viewing. These viewer selectable channels are composed from a multiplicity of multi-media segments transmitted both prior to and concurrent with viewing, potentially via a plurality of networks as directed by the play-list 300.

In an alternate embodiment, the program customization 41 may optionally be required to acknowledge to the provider of the play-list 300 that it has been received. Play-lists 300 may cover any time period, with different play-lists 300 for different viewer selectable channels being refreshed at different times. For example, the play-list A associated with channel A may describe how to create channel A from midnight on one day to midnight of the next. The play-list B associated with channel B may describe how to create channel B from noon one day to noon the next. The play-list C may be refreshed every 8 hours, to create channel C. Play-lists 300 may identify multiple multi-media segments to be synchronized for playout. For example, video may be obtained from live traditional broadcast, with audio obtained from a previously received file received from a different transport network, such as the internet. The play-list 300 may indicate that the files are to be played out synchronously. An application of this would be a video mail merge for advertising—that is, a new car ad could play out for all viewers with an audio track unique to the specific household "And this week, just for you John Doe, this new car can be yours for $25000". The portion of the audio track that specifies "John Doe" could be received as a separate audio segment to be synced with the portion of the ad where it is called for.

Creation of Play-List 700 at the Head-End

Figure 7:
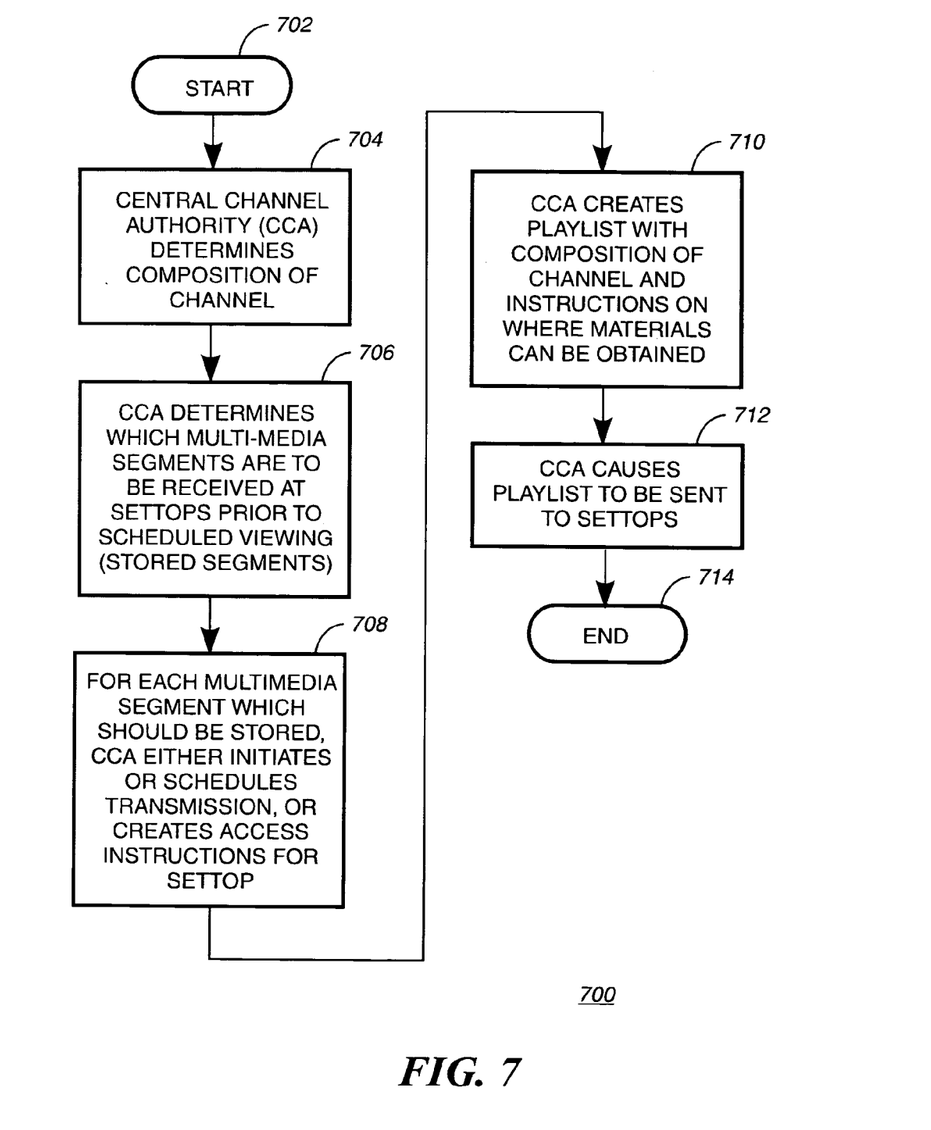
FIG. 7 is a flow diagram of the creation of the play-list at a head-end of FIG. 1 according to the present invention.

Turning now to FIG. 7, shown is a flow diagram of the creation of the play-list 300 by the program provider, according to the present invention. In the flow diagram 700, the place where the program provider creates the playlist is referred to as the Central Channel Authority (CCA). In FIG. 7, we continue the convention of FIG. 6 where a combined set-top box 43 and customization device 41 is referred to as the set-top box 43. The CCA determines the composition of a channel, steps 702 and 704. The CCA determines which multi-media segments are to be received at each group of combined set-top box 43, as identified in FIG. 2 above. These set-top box 43s in each group are group addressed for a play-list 300. In steps 706 and 708, the CCA determines which multimedia segments are to be received prior to the scheduled viewing and initiates transmission via a broadcast or distribution through computer readable medium, such as the Internet, CDs and DVDs. The playlist includes addresses and instructions on how the multimedia segments that make up the play-lists 300 are accessed. The play-list 300 is sent to the group addressed set-top boxes 43, steps 712 and 714.

Business Models for Providers of Play-Lists

This invention enables several other new business models. The business entity which creates the play-list 300 may be different from the broadcast entity. For example, an enterprise may desire to get into the business of supplying play-lists 300 for medical enthusiasts ("the doctor show channel"). Such play-lists 300 could stitch together any broadcast shows with medical content, potentially select a choice based on user demographics or preference if two shows are available at the same time, and transmit content owned by the enterprise to the set-top box 43 over the internet for play when no broadcast satisfies the conditions.

Another business model enabled is the following. A broadcast channel could use one frequency allocation to provide multiple viewer selectable channels. For example: for prime time viewing on channel A, the broadcaster could supply five channels—a young female interests, an older female interests, a male interests, a child's interests and a family interests. The broadcast content on the channel A frequency would supply a large part (say 95%) of the content for each of the viewer selectable channels. Key scenes would differ for each of the different channels, with the correct scene supplied over the internet or having been previously supplied on the same channel during a time when the channel is off the air and retained by the set-top box 43. The play-list 300 associated with the viewer selected channel would determine how the show would be constituted. This would allow adults only scenes to be inserted if appropriate, or more detail on a scene of greater interest to one of the viewer groups. A child's version might dwell more on the children in the program, and so on. It is important to note that a group of set-top boxes 43 can contain as few as one set-top box. This is consistent with the definition of group addressing.

Another use within the same business model would be to show instructive materials at different levels. For instance, a home maintenance program might include advanced scenes of woodworking for one user, and might require a less advanced viewer to buy a preassembled piece. Since only short segments are different, the ability to assemble this show via play-list 300 at the point of media consumption requires much less bandwidth than the traditional method of having two channels.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for displaying program content on a viewer information processing system with an interface to a display, the method comprising the steps of:

receiving a play-list and program content from a program provider, wherein the play-list is a list of instructions for the rendering of one or more multimedia segments into a multimedia presentation;

wherein the play-list is based on a user's demographics assembled by the program provider;

wherein the play-list contains pointers to indicate where each of the one or more multimedia segments selected from a group of primary media sources is located;

wherein the play-list contains a multimedia segment availability time when each of the one or more multimedia segments in the play-list is to be received prior to the time the multimedia segment is to be rendered;

receiving, from the program provider, at least one of the one or more multimedia segments required by the play-list;

determining if all the one or more multimedia segments required by the play-list have been received according to the multimedia segment availability time and in response to at least one of the one or more multimedia segments not being so received, then requesting one or more missing multimedia segments from a secondary media source different than the primary media source from which the one or more multimedia segments were previously requested but not received, wherein the secondary media source is selected from the group of secondary media sources consisting of a second broadcast channel, internet, and removable computer readable medium; and displaying the multimedia presentation on the display by rendering the one or more multimedia segments as directed by the play-list.

2. The method of claim 1 wherein the step of receiving at least one of the one or more multimedia segments includes storing at least one multimedia segment.

3. The method for displaying according to claim 1, wherein the step of receiving at least one of the one or more multimedia segments includes receiving at least one multimedia segment over a broadcast infrastructure.

4. The method for displaying according to claim 1, wherein the step of receiving at least one of the one or more multimedia segments includes receiving at least one multimedia segment from a computer readable storage medium.

5. The method for displaying according to claim 1, wherein the step of receiving at least one of the one or more multimedia segments includes receiving at least one multimedia segment over a telecommunications network.

6. The method for displaying according to claim 5, wherein the step of receiving at least one multimedia segment over a telecommunications network includes receiving at least one multimedia segment over the Internet.

7. The method for displaying according to claim 1, further comprising the step of:

displaying the one or more multimedia segments from the information processing system on a television set.

8. The method for displaying according to claim 1, wherein the step of receiving at least one of the one or more multimedia segments includes receiving at least one multimedia segment which is an advertisement.

9. The method for displaying according to claim 1, wherein the step of receiving at least one of the one or more multimedia segments includes receiving at least one multimedia segment which is program content.

10. The method for displaying according to claim 1, wherein the step of receiving a play-list includes receiving a play-list with a date when the multimedia segment is to be rendered.

11. A method for distributing program content from a program provider over a telecommunications infrastructure to a plurality of clients, the method on a program provider comprising the steps of:

breaking program content into a plurality of multimedia segments;

transmitting at least one play-list and program content to at least one client, wherein the play-list is a list of instructions for the rendering of one or more multimedia segments within the plurality of multimedia segments into a multimedia presentation;

wherein the play-list is based on a user's demographics assembled by the program provider;

wherein the play-list contains pointers to indicate where each of the one or more multimedia segments selected from a group of primary media sources is located;

wherein the play-list contains a multimedia segment availability time when each respective multimedia segment within the one or more multimedia segments in the play-list is to be received prior to the time that the respective multimedia segment is to be rendered;

determining if all the one or more multimedia segments required by the play-list have been received according to the multimedia segment availability time and in response to at least one of the one or more multimedia segments not being so received, then requesting one or more missing multimedia segments from a secondary media source different than the primary media source from which the one or more multimedia segments were previously requested but not received, wherein the secondary media source is selected from the group of secondary media sources consisting of a second broadcast channel, internet, and removable computer readable medium; and transmitting the one or more multimedia segments required by said play-lists that form the multimedia presentation.

12. The method of claim 11, where the program provider transmits at least one multimedia segment to at least one client prior to the multimedia presentation by the client.

13. The method of claim 11, further comprising the step of:

grouping one or more clients receiving a play-list based on the demographics of the viewers of the multimedia presentation; and wherein the step of transmitting at least one play-list includes transmitting the identical play-list to one or more clients based on the grouping.

14. The method of claim 11 for distributing program content, wherein the step of transmitting the one or more multimedia segments includes transmitting at least one multimedia segment on a computer readable storage medium.

15. The method of claim 11 for distributing program content wherein the step of transmitting the one or more multimedia segments includes transmitting at least one multimedia segment over a cable network.

16. The method of claim 11 for distributing program content, wherein the step of transmitting the one or more multimedia segments includes transmitting at least one multimedia segment over a telecommunications network.

17. The method of claim 16, for distributing program content wherein the step of transmitting at least one multimedia segments over a telecommunications network includes transmitting at least one multimedia segment on the Internet.

18. A computer readable medium comprising programming instructions for displaying program content on a viewer information processing system with an interface to a display, the programming instructions comprising receiving a play-list and program content from a program provider, wherein the play-list is a list of instructions for the rendering of one or more multimedia segments into a multimedia presentation;

wherein the play-list is based on a user's demographics assembled by the program provider;

wherein the play-list contains pointers to indicate where each of the one or more multimedia segments selected from a group of primary media sources is located;

wherein the play-list contains a multimedia segment availability time when each of the one or more multimedia segments in the play-list is to be received prior to the time the multimedia segment is to be rendered;

receiving, from the program provider, at least one of the one or more multimedia segments required by the play-list;

determining if all the one or more multimedia segments required by the play-list have been received according to the multimedia segment availability time and in response to at least one of the one or more multimedia segments not being so received, then requesting one or more missing multimedia segments from a secondary media source different than the primary media source from which the one or more multimedia segments were previously requested but not received, wherein the secondary media source is selected from the group of secondary media sources consisting of a second broadcast channel, internet, and removable computer readable medium; and displaying the multimedia presentation on the display by rendering the one or more multimedia segments as directed by the play-list.

19. The computer readable medium of claim 18, wherein said programming instruction includes receiving at least one of the one or more multimedia segments prior to the presentation being displayed, and storing at least one multimedia segment.

20. The computer readable medium according to claim 18, wherein the programming instruction of receiving at least one of the one or more multimedia segments includes receiving at least one multimedia segment over a broadcast infrastructure.

21. The computer readable medium according to claim 18, wherein the programming instruction of receiving at least one of the one or more multimedia segments includes receiving at least one multimedia segment from a computer readable storage medium.

22. The computer readable medium according to claim 18, wherein the programming instruction of receiving at least one of the one or more multimedia segments includes receiving at least one multimedia segment over a telecommunications network.

23. The computer readable medium according to claim 22, wherein the programming instruction of receiving at least one multimedia segment over a telecommunications network includes receiving at least one multimedia segment over the Internet.

24. The computer readable medium according to claim 18, wherein the programming instruction of displaying includes displaying the one or more multimedia segments from the information processing system on a television set.

25. The computer readable medium according to claim 18, wherein the programming instruction for receiving at least one of the one or more multimedia segments includes receiving at least one multimedia segment of an advertisement.

26. The computer readable medium according to claim 18, wherein the programming instruction for receiving at least one of the one or more multimedia segments includes receiving at least one multimedia segment of program content.

27. The computer readable medium according to claim 18, wherein the programming instruction for receiving a play-list includes receiving a play-list with a date when the multimedia segment is to be rendered.

28. A viewer information processing system with an interface to a display for program content, the viewer information system comprising a receiver for receiving a play-list and program content from a program provider wherein the play-list is a list of instructions for the rendering of one or more multimedia segments into a multimedia presentation;

wherein the play-list is based on a user's demographics assembled by the program provider;

wherein the play-list contains pointers to indicate where each of the one or more multimedia segments selected from a group of primary media sources is located;

wherein the play-list contains a multimedia segment availability time when the one or more multimedia segments in the play-list is to be received prior to the time the multimedia segment is to be rendered;

a receiver for receiving at least one of the one or more multimedia segments from the program provider;

means for determining if all the one or more multimedia segments required by the play-list have been received according to the multimedia segment availability time and in response to at least one of the one or more multimedia segments not being so received, then requesting one or more missing multimedia segments from a secondary media source different than the primary media source from which the one or more multimedia segments were previously requested but not received, wherein the secondary media source is selected from the group of secondary media sources consisting of a second broadcast channel, internet, and removable computer readable medium;

a means for rendering the one or more multimedia segments into the multimedia presentation as directed by the play-list; and an interface to a display for displaying said multimedia presentation.

29. The viewer information processing system of claim 28, further comprising an interface to storage for storing at least one multimedia segment.

30. The viewer information processing system according to claim 28, wherein the receiver has an interface to a broadcast infrastructure.

31. The viewer information processing system according to claim 28, wherein the receiver has an interface to a computer readable storage medium.

32. The viewer information processing system according to claim 28, wherein the receiver has an interface to a telecommunications network.

33. The viewer information processing system according to claim 32, wherein the receiver interface to a telecommunications network includes an interface to the Internet.

* * * * *